United States Patent
Hu

(10) Patent No.: US 8,209,473 B2
(45) Date of Patent: Jun. 26, 2012

(54) FLASH STORAGE DEVICE AND OPERATING METHOD THEREOF

(75) Inventor: Shui-Hua Hu, Jhubei (TW)

(73) Assignee: Silicon Motion, Inc., Jhubei (TW)

( * ) Notice: Subject to any disclaimer, the term of this patent is extended or adjusted under 35 U.S.C. 154(b) by 312 days.

(21) Appl. No.: 12/562,085

(22) Filed: Sep. 17, 2009

(65) Prior Publication Data

US 2010/0268868 A1    Oct. 21, 2010

(30) Foreign Application Priority Data

Apr. 15, 2009   (TW) .............................. 98112467 A

(51) Int. Cl.
G06F 12/00  (2006.01)
G06F 12/02  (2006.01)

(52) U.S. Cl. ......... 711/103; 711/104; 711/206; 711/207

(58) Field of Classification Search .......... 711/103–104, 711/202, 206–207, 221, E12.001, E12.008
See application file for complete search history.

(56) References Cited

U.S. PATENT DOCUMENTS

2007/0143569 A1 * 6/2007 Sanders et al. ................ 711/203
2007/0300037 A1   12/2007 Rogers et al.

FOREIGN PATENT DOCUMENTS

TW    200523946    7/2005

OTHER PUBLICATIONS

Office Action of corresponding CN application, mailed Mar. 24, 2011.

* cited by examiner

*Primary Examiner* — Jasmine Song
(74) *Attorney, Agent, or Firm* — Wang Law Firm, Inc.; Li K. Wang

(57) ABSTRACT

The invention also provides a flash storage device. In one embodiment, the flash storage device is coupled to a host, and comprises a random access memory and a controller. The random access memory stores a plurality of link tables therein, wherein each of the link tables corresponds to one of a plurality of management units of at least one flash memory, and the link tables store corresponding relationships between logical addresses and physical addresses of the corresponding management units. The controller receives an access logical address from the host, determines an access physical address corresponding to the access logical address according to the link tables stored in the random access memory, and accesses data from the flash memory according to the access physical address.

10 Claims, 5 Drawing Sheets

FLASH STORAGE DEVICE AND OPERATING METHOD THEREOF

CROSS REFERENCE TO RELATED APPLICATIONS

This Application claims priority of Taiwan Patent Application No. 98112467, filed on Apr. 15, 2009, the entirety of which is incorporated by reference herein.

BACKGROUND OF THE INVENTION

1. Field of the Invention

The invention relates to memories, and more particularly to flash memories.

2. Description of the Related Art

A flash memory is a non-volatile memory that can be electrically erased and reprogrammed. Flash memories are primarily used in memory cards and USB flash drives for general storage and transfer of data between computers and other digital products. A flash memory costs far less than an EEPROM and therefore has become a dominant memory device applied in electronic products. Examples of applications include Personal Digital Assistants (PDA) and laptop computers, digital audio players, digital cameras and mobile phones.

A flash memory is commonly included in a data storage device for data storage. The data storage device including a flash storage device is called a flash storage device. Referring to FIG. 1, a block diagram of a system 100 comprising a conventional flash storage device 104 is shown. The flash storage device 104 comprises a controller 110, a random access memory 120, and flash memories 130 and 140. The flash storage device 104 is coupled to a host 102 and stores data for the host 102. In one embodiment, the host 102 is a computer, a digital camera, or a digital audio player, and the flash storage device 104 is a memory card or a memory disk.

When access to the flash storage device 104 is required, a host 102 sends access commands to the flash storage device 104. The controller 110 of the flash storage device 104 then accesses the flash memories 130 and 140 for the host 102 according to the access commands. Data stored in the flash memories 130 and 140 is accessed according to physical addresses. The controller 110 therefore first must convert logical addresses sent by the host 102 to physical addresses and then access data stored in the flash memories 130 and 140 according to the physical addresses. The random access memory 120 stores a link table 121 recording a mapping relationship between the logical addresses used by the host 102 and physical addresses used by the flash memories 130 and 140. Thus, the controller 110 can therefore convert logical addresses to physical addresses according to the link table 121.

A flash memory comprises a plurality of management units for respectively managing data stored therein. For examples, the flash memory 130 comprises management units 131~13G, and the flash memory 140 comprises management units 141~14H. Each of the management units 131~13G and 141~14H has a corresponding link table for storing a mapping relationship between logical addresses and physical addresses of blocks thereof. The random access memory 120 of the conventional flash storage device 104 stores only one link table 121. When an access logical address accessed by the host 102 does not fall into the logical addresses stored in the link table 121, the controller 110 must load a new link table storing the access logical address to the random access memory 120, and then convert the access logical address to a physical address according to the new link table stored in the random access memory 120.

When the host 102 only accesses data with logical addresses of a small range, the controller 110 of the conventional flash storage device 104 does not need to frequently replace the link table 121 stored in the random access memory 120 with a new link table. When the host 102 accesses data with logical addresses of a large range, the controller 110 of the conventional flash storage device 104 must frequently replace the link table 121 stored in the random access memory 120 with a new link table. Frequent replacement of the link table 121 causes access time delays for accessing data stored in the flash memories 130 and 140, thus degrading performance of the flash storage device 104. Thus, a flash storage device without the aforementioned shortcomings is required.

BRIEF SUMMARY OF THE INVENTION

The invention provides a flash storage device. In one embodiment, the flash storage device is coupled to a host, and comprises at least one flash memory, a random access memory, and a controller. The at least one flash memory is divided into a plurality of management units, wherein each of the management units comprises a plurality of blocks for data storage, and each of the management units has a link table for storing a corresponding relationship between logical addresses and physical addresses of the blocks thereof. The random access memory is divided into a plurality of slots, wherein each of the slots stores one of the link tables corresponding to the management units. The controller receives an access logical address from the host, retrieves a target link table storing the access logical address from the link tables stored in the random access memory, determines an access physical address corresponding to the access logical address according to the target link table, and accesses data from the flash memory according to the access physical address.

The invention also provides a method for accessing a flash storage device. In one embodiment, the flash storage device is coupled to a host and comprises at least one flash memory. First, a plurality of link tables is stored in a random access memory, wherein each of the link tables corresponds to one of a plurality of management units of the flash memory, and the link tables store corresponding relationships between logical addresses and physical addresses of the corresponding management units. An access logical address is then received from the host. An access physical address corresponding to the access logical address is then determined according to the link tables stored in the random access memory. Finally, data is accessed from the flash memory according to the access physical address.

The invention also provides a flash storage device. In one embodiment, the flash storage device is coupled to a host, and comprises a random access memory and a controller. The random access memory stores a plurality of link tables therein, wherein each of the link tables corresponds to one of a plurality of management units of at least one flash memory, and the link tables store corresponding relationships between logical addresses and physical addresses of the corresponding management units. The controller receives an access logical address from the host, determines an access physical address corresponding to the access logical address according to the link tables stored in the random access memory, and accesses data from the flash memory according to the access physical address.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 2:
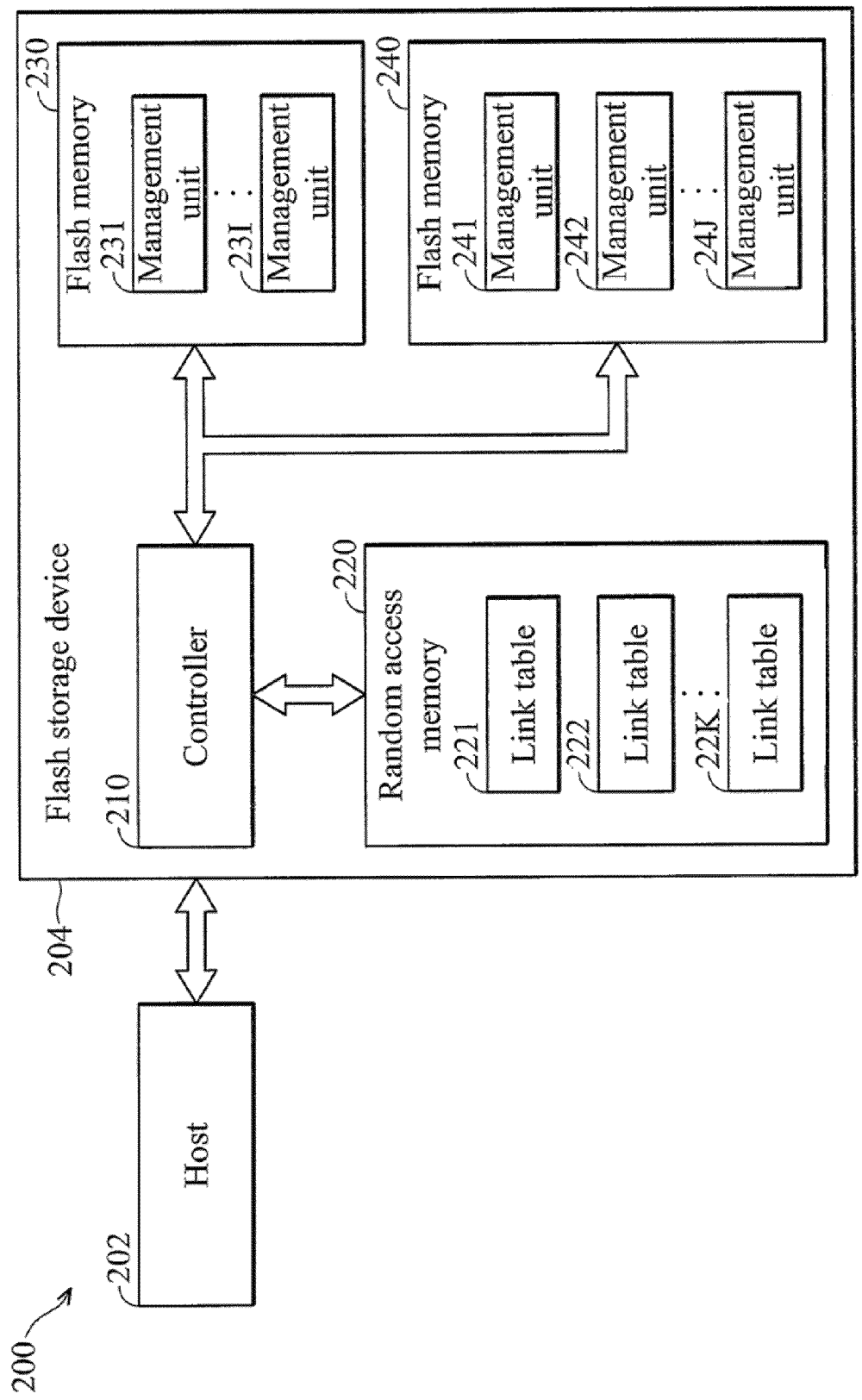
FIG. 2 is a block diagram of a system comprising a flash storage device according to the invention.

Referring to FIG. 2, a block diagram of a system 200 comprising a flash storage device 204 according to the invention is shown. The flash storage device 204 is coupled to a host 202 and stores data for the host 202. In one embodiment, the host 202 is a computer, a digital camera, or a digital audio player, and the flash storage device 204 is a memory card or a memory disk. In one embodiment, the flash storage device 204 comprises a controller 210, a random access memory 220, and flash memories 230 and 240. The flash memories 230 and 240 comprise a plurality of management units 231-23I and 241-24J. Each of the management units 231-23I manages a plurality of blocks of the flash memory 230, and each of the management units 241-24J manages a plurality of blocks of the flash memory 240. When access to data stored in the flash memories 230 and 240 by the host 202 is required, the host 202 sends access commands to the flash storage device 204. The controller 210 then accesses the flash memories 230 and 240 according to the access commands.

The blocks of the flash memories 230 and 240 are accessed according to physical addresses, and the host 202 accesses data according to logical addresses. The controller 210 therefore must convert logical addresses sent from the host 202 to physical addresses and can then access the flash memories 230 and 240 according to the physical addresses. Each of the management units 231~23I and 241~24J of the flash memories 230 and 240 has a corresponding link table for storing a mapping relationship between logical addresses and physical addresses of blocks thereof. The controller 210 must first load a link table comprising a logical address accessed by the host 202 to the random access memory 220 and then convert the logical address to a physical address according to the link table.

Figure 1:
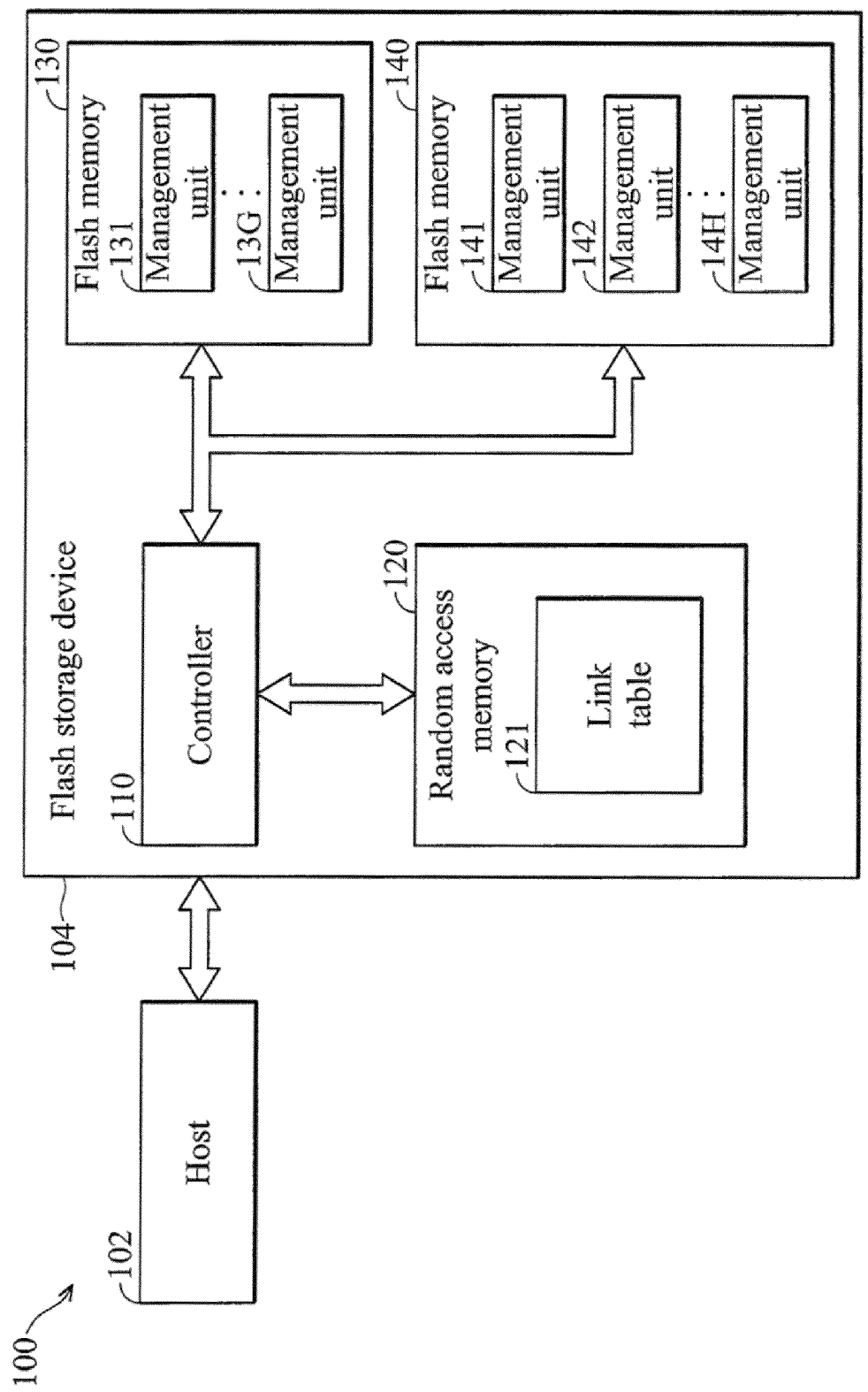
FIG. 1 is a block diagram of a system comprising a conventional flash storage device.

Different from the conventional flash storage device 104 shown in FIG. 1, the random access memory 220 of the flash storage device 204 comprises a plurality of slots, and each of the slots is used to store a link table. The random access memory 220 therefore can store a plurality of link tables 221~22K. In one embodiment, the flash memories 230 and 240 comprise a large amount of management units 231~23I and 241~24J, and each of the management units 231~23I and 241~24J manages a lesser amount of blocks than those of the blocks managed by the management units 131-13G and 141-14H. The management units 231~23I and 241~24J therefore manages less data amount than those of the management units 131~13G and 141~14H. Thus, the random access memory 220 can store a larger amount of link tables 221-22K than the random access memory 120 shown in FIG. 1. In another embodiment, the random access memory 220 has larger memory capacity than that of the random access memory 120 shown in FIG. 1, and the random access memory 220 can therefore store a larger amount of link tables 221-22K than the random access memory 120. Because the random access memory 220 can store a plurality of link tables, the frequency by which the controller loads new link tables to the random access memory 220 is lowered, thus reducing access time periods of the flash memories 230 and 240, which improves performance of the flash storage device 204.

For example, when the host 202 sends a request to the flash storage device 204 to access data stored in a file, the controller 210 must access as least three different data information such as a file allocation table (FAT), a directory entry table, and the file. The controller 210 therefore must first read three link tables respectively storing logical addresses of the three data information for logical address to physical address conversion before the controller 210 accesses the three data information according to physical addresses. Because the random access memory 220 has a plurality of slots, all of the link tables corresponding to logical addresses of the data information of the file allocation table, the directory entry table, and the file can be stored in slots of the random access memory 220. The controller 210 therefore does not need to frequently load new link tables to the random access memory 220. Contrarily, because the random access memory 120 of the conventional flash storage device 104 can store only one link table, the controller 110 of the conventional flash storage device 104 must repeatedly load new link tables respectively corresponding to the file allocation table, the directory entry table, and the file to the random access memory 120, increasing the time period for file access, and degrading performance of the conventional flash storage device 104. Thus, performance of the flash storage device 204 therefore is better than that of the conventional flash storage device 104.

Figure 3:
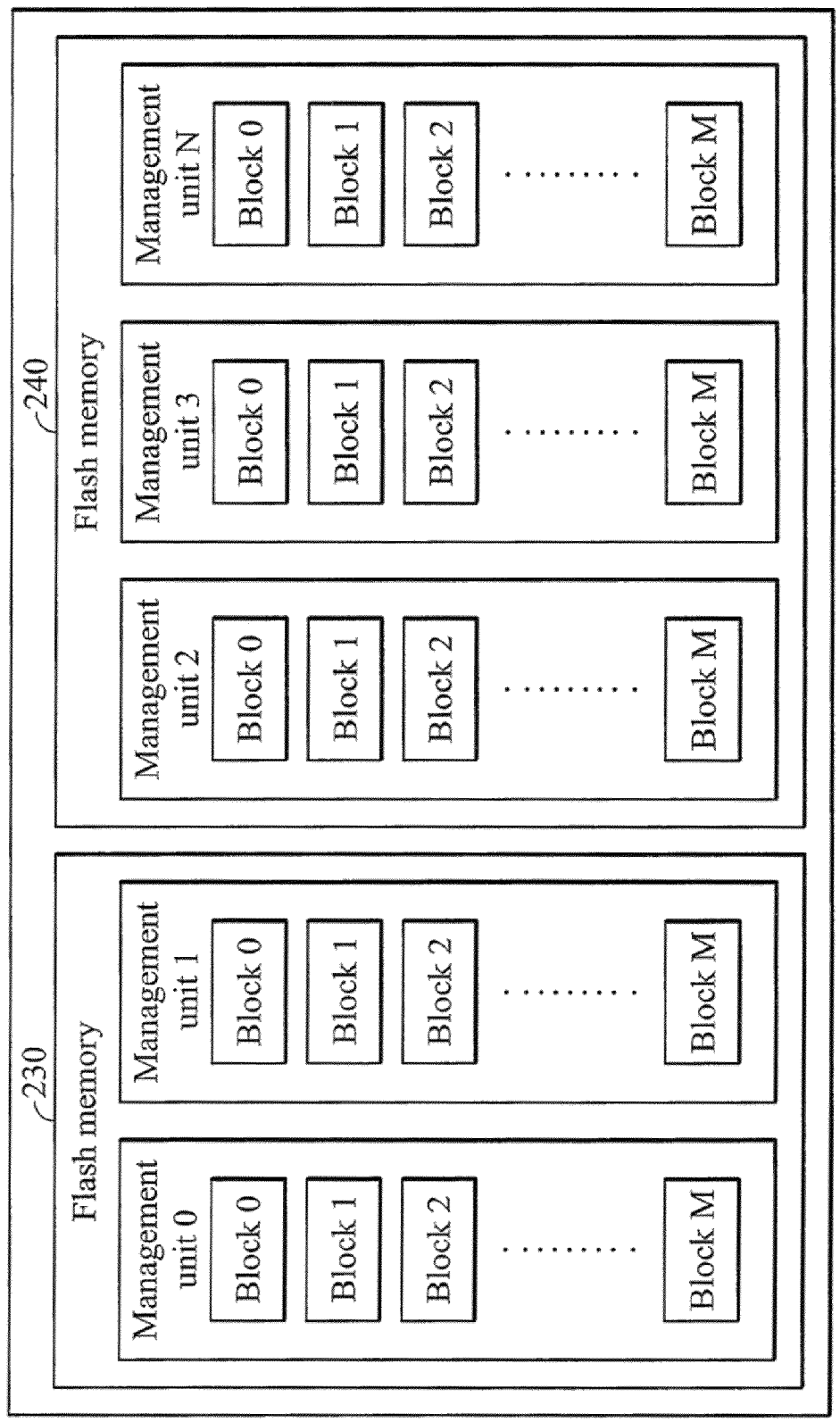
FIG. 3 is a schematic diagram of flash memories comprised by a flash storage device according to the invention.
Figure 4:
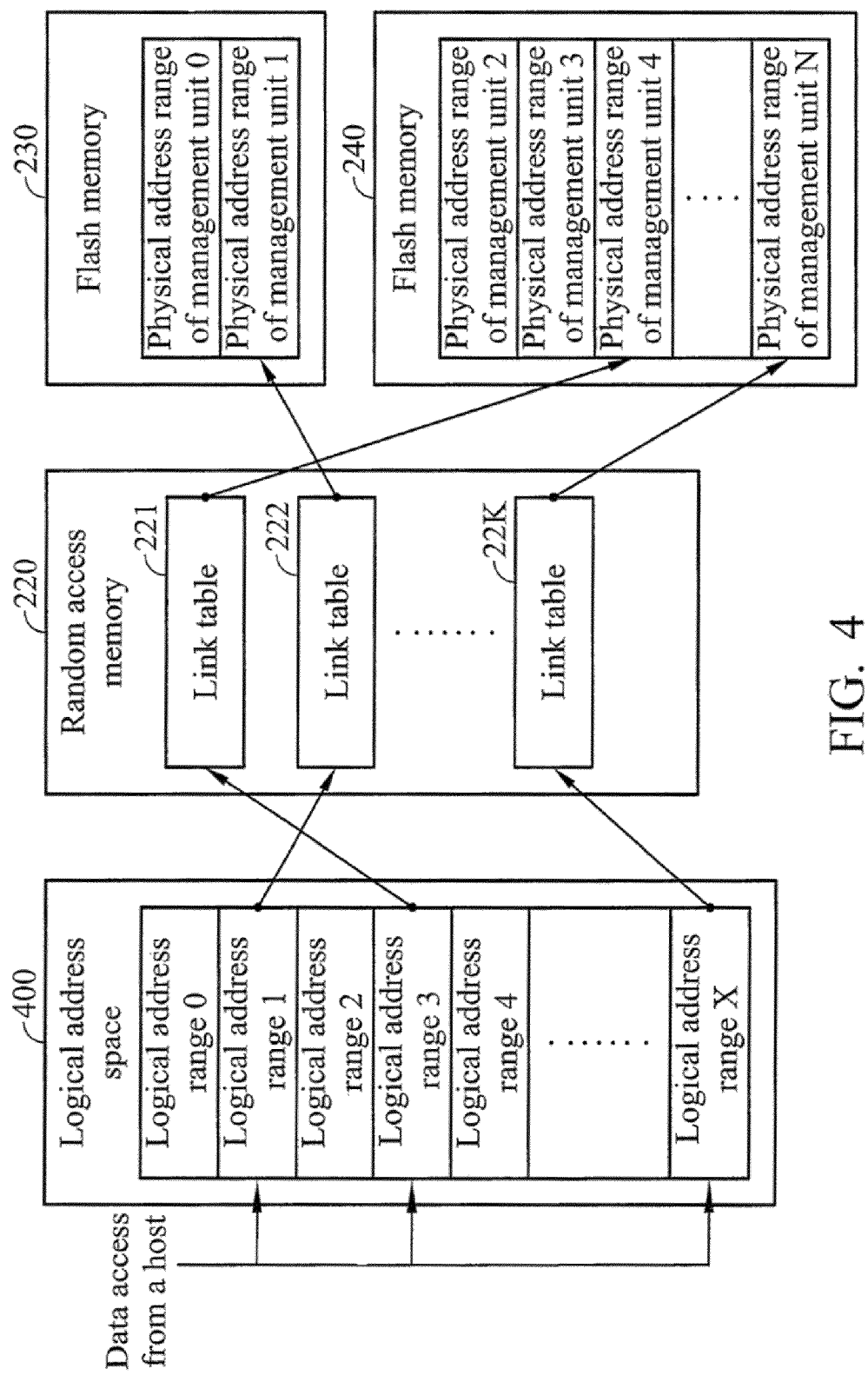
FIG. 4 is a schematic diagram of a corresponding relationship between logical address space and physical address space of a flash storage device according to the invention.

Referring to FIG. 3, a schematic diagram of flash memories 230 and 240 comprised by the flash storage device 204 according to the invention is shown. In one embodiment, the flash memory 230 comprises two management units 0 and 1. Both of the management units 0 and 1 comprise M blocks. In one embodiment, the flash memory 240 comprises (N-1) management units 2, 3, . . . , N. Each of the management units 2~N also comprises M blocks. Referring to FIG. 4, a schematic diagram of a corresponding relationship between logical address space 400 and physical address space of the flash storage device 204 according to the invention is shown. Assume that the logical space 400 accessed by the host 202 is divided into logical address ranges 0~X. The management units 0 and 1 of the flash memory 230 respectively have corresponding physical address ranges, and the management units 2~N of the flash memory 240 respectively have corresponding physical address ranges.

As shown in FIG. 4, when access to data of logical address ranges 0~X by the host 202 is required, the controller 210 converts the logical address ranges 0~X to physical address ranges of corresponding management units according to the link tables 221~22K stored in the random access memory 220. For example, the logical address range 1 is converted to the physical address range corresponding to the management unit 1 according to the link table 222. The logical address range 3 is converted to the physical address range corresponding to the management unit 4 according to the link table 221. The logical address range X is converted to the physical address range corresponding to the management unit N according to the link table 22K. The physical address spaces of the link tables 221~22K are not continuous.

Figure 5:
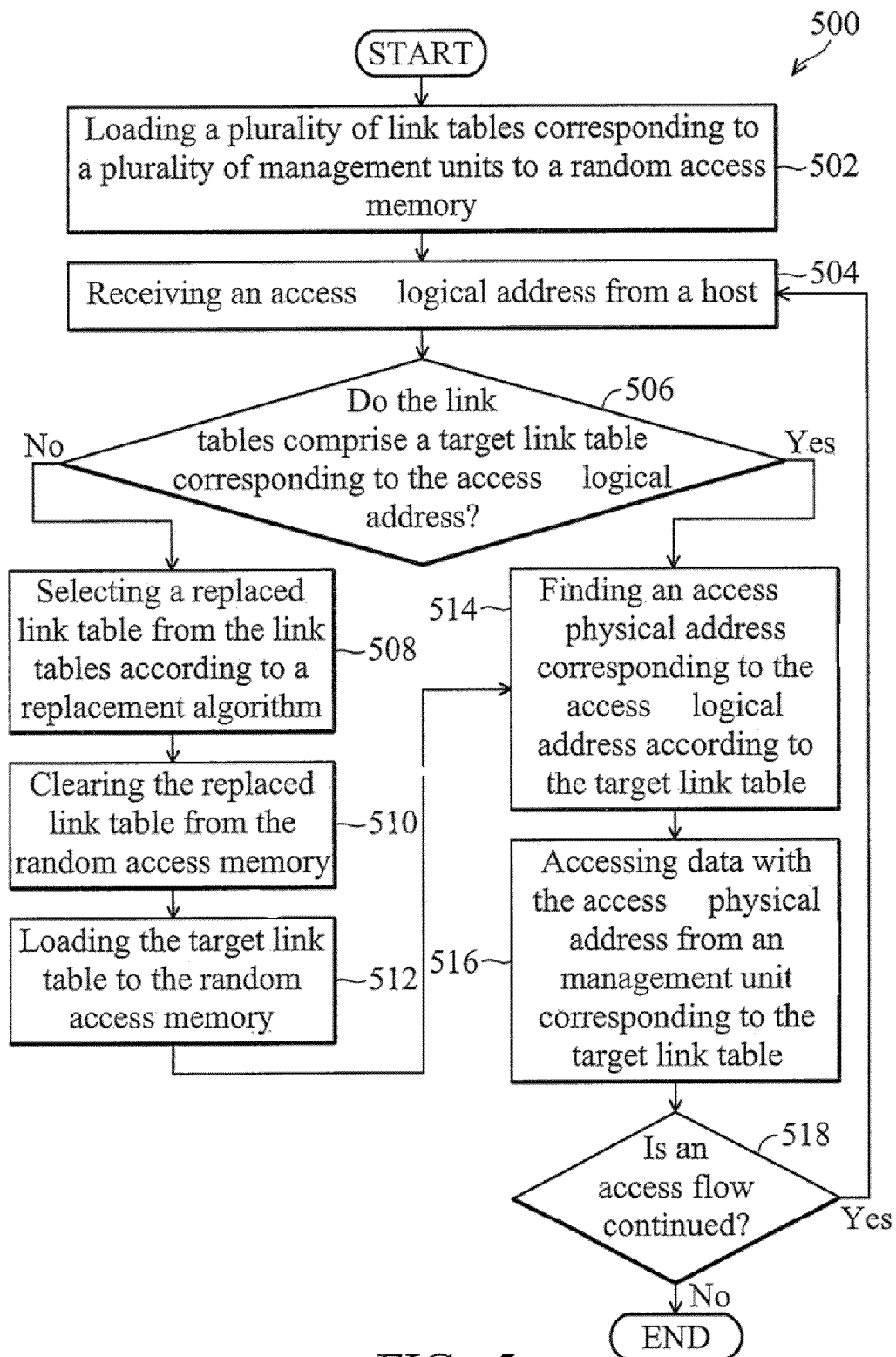
FIG. 5 is a flowchart of a method for operating a flash storage device according to the invention.

Referring to FIG. 5, a flowchart of a method 500 for operating a flash storage device 204 according to the invention is shown. First, the controller 210 loads a plurality of link tables 221~22K corresponding to a plurality of management units to the random access memory 220 (step 502). The controller 210 then receives an access logical address from a host 202 (step 504). The controller 210 then reads the random access memory 220 to determine whether the link tables 221~22K comprise a target link table storing the access logical address sent by the host 202 (step 506). If the link tables 221~22K comprise the target link table, the controller 210 determines an access physical address corresponding to the access logical address according to the target link table (step 514), and then accesses data with the access physical address from an management unit corresponding to the target link table (step 516), thus completing operations requested by the host 202.

Otherwise, when the link tables 221~22K do not comprise the target link table storing the access logical address (step 506), the controller 210 must load the target link table to the random access memory 220. The random access memory 220 may not have enough empty spaces to hold the target link table, thus, the controller 210 first selects a replaced link table from the link tables 221~22K according to a replacement algorithm (step 508), and then clears the replaced link table from the random access memory 220 to obtain an empty slot (step 510). The controller 210 then loads the target link table to the random access memory 220 (step 512). The controller 210 can then determine an access physical address corresponding to the access logical address according to the target link table (step 514), and then access data with the access physical address from an management unit corresponding to the target link table (step 516). If the access flow is continued (step 518), the controller 210 receives a new access logical address from the host 202 (step 502), and performs steps 504~516 according to the new access logical address.

The controller 210 may select different link tables 221~22K stored in the random access memory 220 as a replaced link table from step 508. In one embodiment, the controller 210 records access frequencies by which the host 202 accesses the management units 0~N in advance. When a replaced link table is to be selected, the controller 210 then selects a link table with the lowest access frequency as the replaced link table. Thus, link tables with higher access frequencies are kept in the random access memory 220. In another embodiment, the controller 210 records access time at which the host 202 accesses the management units 0~N in advance. When a replaced link table is to be selected, the controller 210 then selects a link table with the earliest access time as the replaced link table. Thus, link tables with later access times are kept in the random access memory 220. In addition, some specific link tables are frequently accessed by the host 202, and the controller 210 does not select the specific link tables as the replaced link table, such as a link table storing addresses corresponding to data of a file allocation table or a link table storing addresses corresponding to data of a directory entry table.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A flash storage device, coupled to a host, comprising:
  at least one flash memory, divided into a plurality of management units, wherein each of the management units comprises a plurality of blocks for data storage, and each of the management units has a link table for storing a corresponding relationship between logical addresses and physical addresses of the blocks thereof;
  a random access memory, divided into a plurality of slots, wherein each of the slots stores one of the link tables corresponding to the management units; and
  a controller, recording access frequencies by which the host accesses data of the management units, receiving an access logical address from the host, retrieving a target link table storing the access logical address from the link tables stored in the random access memory, determining an access physical address corresponding to the access logical address according to the target link table, and accessing data from the flash memory according to the access physical address;
  wherein when the controller cannot find the target link table storing the access logical address from the link tables stored in the random access memory, the controller selects the link table corresponding to a lowest access frequency as a replaced link table, clears the replaced link table from the random access memory, and then loads the target link table to the random access memory.

2. The flash storage device as claimed in claim 1, wherein the link tables stored in the random access memory comprise a specific link table corresponding to a specific management unit storing a file allocation table (FAT), and the controller does not select the specific link table as the replaced link table.

3. The flash storage device as claimed in claim 1, wherein the link tables stored in the random access memory comprise a specific link table corresponding to a specific management unit storing a directory entry table, and the controller does not select the specific link table as the replaced link table.

4. The flash storage device as claimed in claim 1, wherein the flash storage device is a memory card or a memory disk.

5. The flash storage device as claimed in claim 1, wherein the physical address spaces of the link tables stored in the random access memory are not continuous.

6. A method for accessing a flash storage device, wherein the flash storage device is coupled to a host and comprises at least one flash memory, comprising:
  storing a plurality of link tables in a random access memory, wherein each of the link tables corresponds to one of a plurality of management units of the flash memory, and the link tables store corresponding relationships between logical addresses and physical addresses of the corresponding management units;
  receiving an access logical address from the host;
  determining an access physical address corresponding to the access logical address according to the link tables stored in the random access memory; and
  accessing data from the flash memory according to the access physical address;
  determining whether the link tables stored in the random access memory comprise a target link table storing the access logical address; and
  when the link tables stored in the random access memory do not comprise the target link table, loading the target link table to the random access memory;

wherein loading of the target link table further comprises:
  determining whether the random access memory has empty space for storing the target link table;
  when the random access memory does not have empty space for storing the target link table, selecting a replaced link table from the link tables stored in the random access memory, and clearing the replaced link table from the random access memory;
  wherein the replaced link table is the link table with a lowest host access frequency or an earliest host access time in comparison with the other link tables stored in the random access memory.

7. The method as claimed in claim 6, wherein the flash storage device is a memory card or a memory disk.

8. A flash storage device, coupled to a host, comprising:
  a random access memory, storing a plurality of link tables therein, wherein each of the link tables corresponds to one of a plurality of management units of at least one flash memory, and the link tables store corresponding relationships between logical addresses and physical addresses of the corresponding management units; and
  a controller, receiving an access logical address from the host, determining an access physical address corresponding to the access logical address according to the link tables stored in the random access memory, and accessing data from the flash memory according to the access physical address;
  wherein the controller determines whether the link tables stored in the random access memory comprise a target link table storing the access logical address, and loads the target link table to the random access memory when the link tables stored in the random access memory do not comprise the target link table;
  wherein when the controller loads the target link table to the random access memory, the controller determines whether the random access memory has empty space for storing the target link table, and when the random access memory does not have empty space for storing the target link table, the controller selects a replaced link table with a lowest host access frequency or an earliest host access time in comparison with the other link tables stored in the random access memory, and clears the replaced link table from the random access memory.

9. The flash storage device as claimed in claim 8, wherein the flash storage device is a memory card or a memory disk.

10. A flash storage device, coupled to a host, comprising:
  at least one flash memory, divided into a plurality of management units, wherein each of the management units comprises a plurality of blocks for data storage, and each of the management units has a link table for storing a corresponding relationship between logical addresses and physical addresses of the blocks thereof;
  a random access memory, divided into a plurality of slots, wherein each of the slots stores one of the link tables corresponding to the management units; and
  a controller, recording access time at which the host accesses data of the management units, receiving an access logical address from the host, retrieving a target link table storing the access logical address from the link tables stored in the random access memory, determining an access physical address corresponding to the access logical address according to the target link table, and accessing data from the flash memory according to the access physical address;
  wherein when the controller cannot find the target link table storing the access logical address from the link tables stored in the random access memory, the controller selects the link table corresponding to an earliest access time as a replaced link table, clears the replaced link table from the random access memory, and then loads the target link table to the random access memory.

* * * * *